Figure 1:
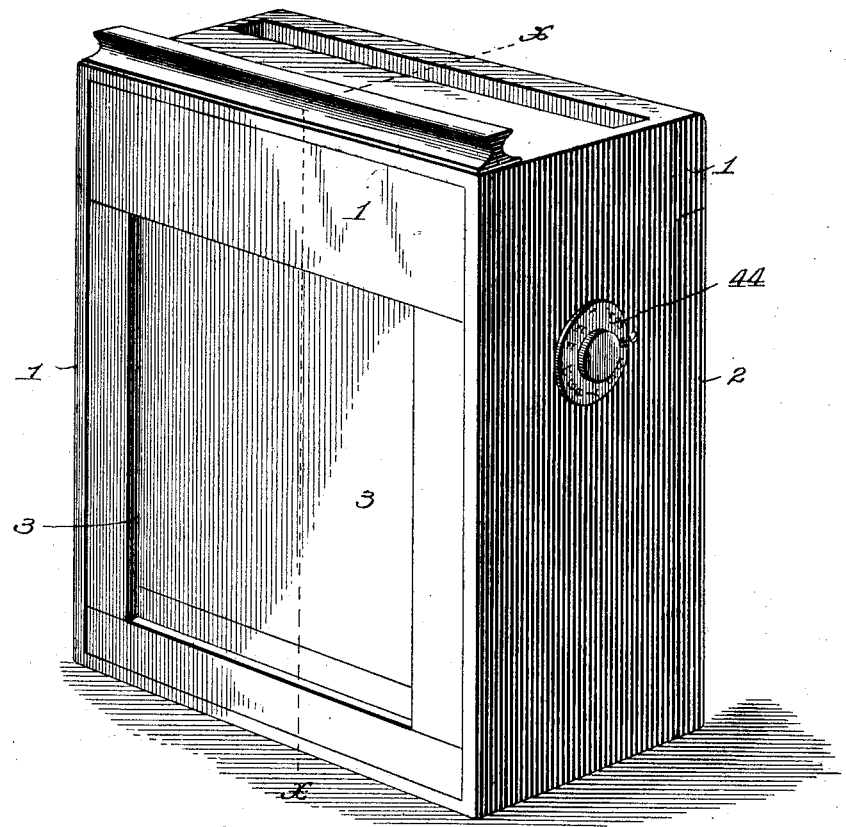

No. 619,860. Patented Feb. 21, 1899.
E. R. BULLARD & C. C. SMITH.
MAGAZINE PLATE HOLDER.
(Application filed Aug. 20, 1897.)
(No Model.) 3 Sheets—Sheet 1.

WITNESSES: INVENTORS
Edgar R. Bullard
Clement C. Smith
by Hugh M. Sterling
ATTORNEY.

No. 619,860. Patented Feb. 21, 1899.
E. R. BULLARD & C. C. SMITH.
MAGAZINE PLATE HOLDER.
(Application filed Aug. 20, 1897.)
(No Model.) 3 Sheets—Sheet 2.
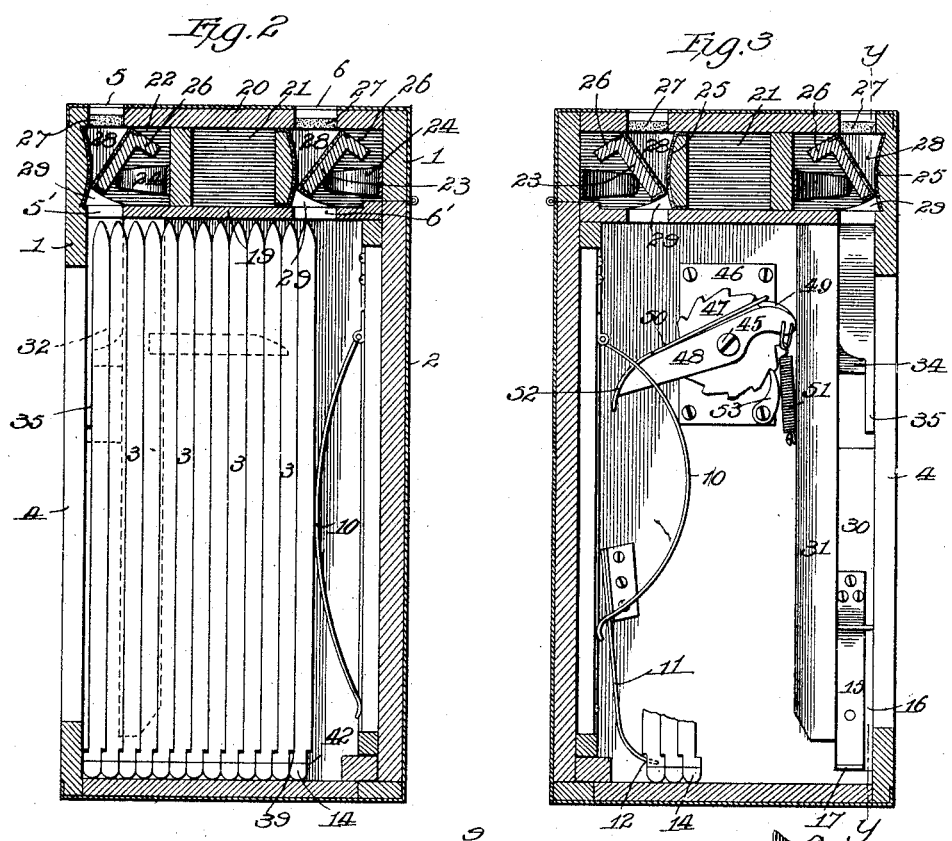
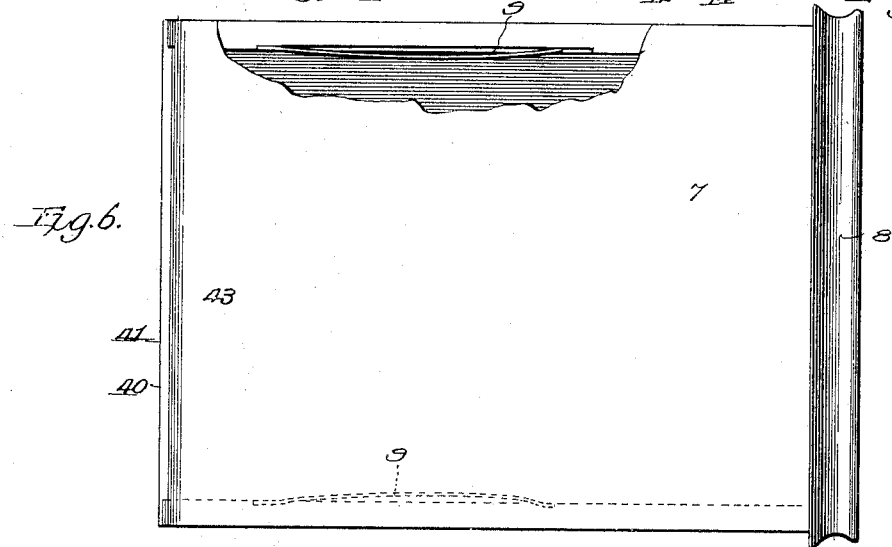
WITNESSES: INVENTORS
Edgar R. Bullard
Clement C. Smith
by Hugh M. Sterling
ATTORNEY.

No. 619,860. Patented Feb. 21, 1899.
E. R. BULLARD & C. C. SMITH.
MAGAZINE PLATE HOLDER.
(Application filed Aug. 20, 1897.)
(No Model.) 3 Sheets—Sheet 3.
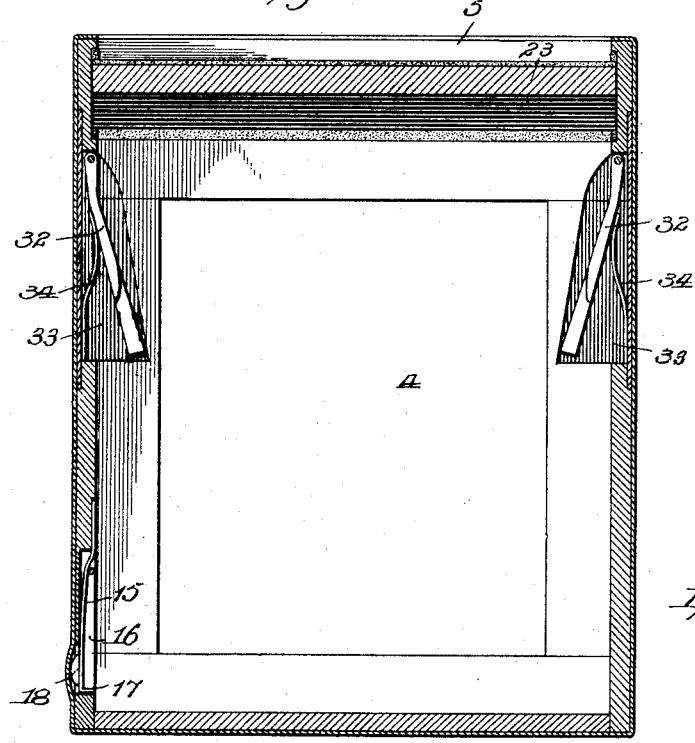
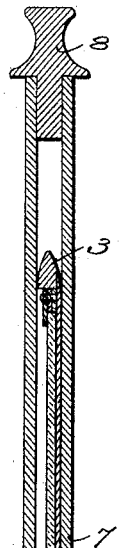
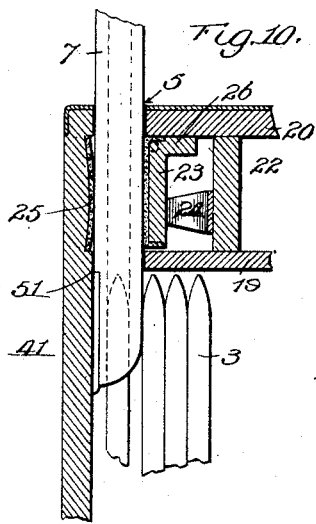
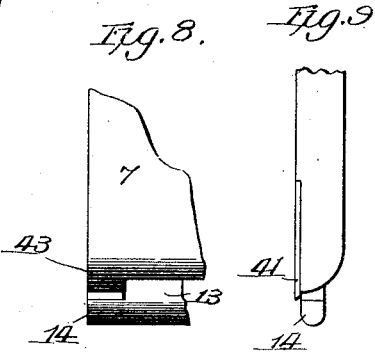
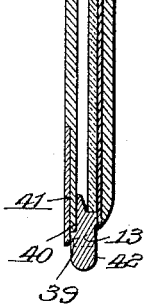
WITNESSES: INVENTORS
Edgar R. Bullard
Clement C. Smith
by Hugh M. Sterling
ATTORNEY.

UNITED STATES PATENT OFFICE.

EDGAR R. BULLARD AND CLEMENT C. SMITH, OF WHEELING, WEST VIRGINIA, ASSIGNORS TO THE BULLARD CAMERA COMPANY, OF SAME PLACE.

MAGAZINE PLATE-HOLDER.

SPECIFICATION forming part of Letters Patent No. 619,860, dated February 21, 1899.

Application filed August 20, 1897. Serial No. 648,892. (No model.)

*To all whom it may concern:*

Be it known that we, EDGAR R. BULLARD and CLEMENT C. SMITH, citizens of the United States, and residents of Wheeling, in the county of Ohio, State of West Virginia, have invented certain new and useful Improvements in Magazines for Cameras; and we do hereby declare that the following is a full, clear, and exact description of the invention, which will enable others skilled in the art to which it appertains to make and use the same, reference being had to the accompanying drawings, and to the figures of reference marked thereon, which form part of this specification.

The invention relates particularly to means employed in cameras for the storage and manipulation for successive exposure of a plurality of photographic plates comprised as the magazine and is primarily designed as a photographic magazine having as its salient features extreme simplicity and compactness of construction, positive action, convenience of manipulation, and of such novel form of mechanism that its working parts are all confined to a case but little larger than one sufficient to inclose the plates or plate-carriers.

The important object of the invention is of a twofold character—namely, the production of a separate or independent magazine that may be attached to the ordinary tourist or gallery camera, as well as one that may be combined in a special instrument, and which in its independent form will be of service when detached as a plate-holder for the safe storage and manipulation of the plates independent of any combination with the camera. By means of this detachable provision three of the greatest objections now cited against magazines are removed—namely, their permanent attachment to a special camera, their form of construction, that precludes the use of a ground glass in focusing, and their usual bulk.

Primarily the invention consists in a magazine for cameras comprising a case either forming a part of the camera-case or independent thereof adapted to contain a pack of plates or plate-carriers having formed therein slots for the transference of the plates or plate-carriers from the front to the rear of the pack and a sliding sheath or case adapted to enter the magazine through one of the slots and inclose a plate or plate-carrier, which, being securely held therein, may be withdrawn with the sheath and deposited at the rear of the pack by the insertion of the sheath within the rear slot, withdrawing itself from the sheath when the sheath is removed.

The invention further consists in an independent attachable magazine for cameras comprising a case having slots therein for the transference of the plate or plate-carriers and an exposure-opening, light-excluding devices for said slots and exposure-opening, and means for manipulating the plates or plate-carriers to effect their transference.

The invention further consists in certain other novel features in the construction and arrangement of parts, all as hereinafter fully set forth and claimed.

Figure 5:
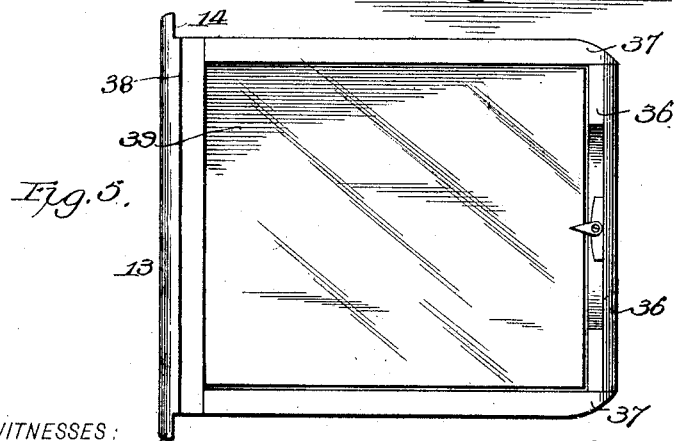

In the accompanying drawings, Figure 1 is a perspective view of the magazine as constructed in its independent or attachable form and showing the transferring-sheath within the forward slot and closing the exposure-opening; Fig. 2, a longitudinal vertical sectional view taken on the line $xx$ of Fig. 1, but showing the case with the transferring-sheath wholly withdrawn; Fig. 3, also a longitudinal vertical sectional view taken on the line $xx$ of Fig. 1, but looking from the opposite side to that from which Fig. 2 is viewed; Fig. 4, a transverse vertical sectional view taken on the line $yy$ of Fig. 3; Fig. 5, a front face view of one of the plate-carriers, showing a plate therein; Fig. 6, a rear face view of the transferring sheath or slide broken away to show in full lines one of the side springs for retaining the carrier within the sheath; Fig. 7, an enlarged sectional view taken through the sheath, plate, and plate-carrier and showing the position of the plate-carrier within the sheath. Figs. 8 and 9 are detail views showing a rear and a side view, respectively, of the sheath with the plate-carrier therein; and Fig. 10 is also a detail view in section, showing the sheath in the act of being forced down through the forward slot and over the forward carrier.

The magazine-case, as heretofore stated, may be that of the camera, should it be desired to constitute it a permanent part thereof, but in all other essentials follows the preferred detachable form shown in the drawings, in which 1 designates a rectangular case or box having a door 2 in its rear for loading the magazine with plates or plate-carriers 3, an exposure-opening 4 in the front thereof, and slots 5 and 6, formed in the top, to provide front and rear passages for the manipulation of the plate-carriers. This case, owing to the means devised for the manipulation of the plate-carriers, is of a size but little larger than the bulk made by the plate-carriers, that are packed therein one upon the other, and is in every respect independent of the camera and being when detached of use as a cabinet-holder for the plates, while permitting the manipulation of the plates or plate-carriers, as when operated in conjunction with the camera.

The slots 5 and 6 are of a size sufficient to admit the slide or sheath 7, which being provided with a grip bar or head 8 is adapted to be inserted and withdrawn by hand to effect the transfer of the carriers from the front to the rear of the pack. This sheath is provided with interior springs 9 at each side, (see Fig. 6,) which yield to the entering carrier as the sheath is forced down to inclose it and exert sufficient pressure upon the inclosed carrier to retain it firmly within the sheath. When in the position shown in Fig. 1, the sheath is in its normal location, where it acts in the same capacity as that of the slide in the ordinary plate-holder, closing thereby the exposure-opening 4, and may be removed to expose the plate that is sheathed within it, as will be hereinafter referred to; but the action of the sheath upon the inclosed carrier in the act of withdrawing and without the interposition of other means acting on the carrier is to extract said carrier from the case.

Upon the removal of the sheath with the extracted carrier the pack of carriers are automatically advanced by the flat springs 10, located at the rear of the case and having their upper ends pivoted or hinged to the door 2, while the lower ends are free to move up and down, according as the springs are depressed or lessened in their tension. By virtue of being secured to the door the pressure of the springs is not only relieved upon the opening of the door, but the springs being carried with the door are by such opening moved out of the way and free access to the interior of the magazine is had. These springs yield readily to the entering sheath with its carrier, for, as is obvious, the continuation of the operation is the insertion of the withdrawn sheath into the magazine through slot 6. This operation causes the sheath to engage the rear face of the rear carrier and to position itself between the said rear carrier and the springs 10. As the sheath further descends it engages a spring-catch 11 in the form of a curved flat spring arranged in an approximately vertical position, but slightly inclining forward to perform also a guiding function. The lower end of this spring is free and is curved to form the engaging or catch portion 12. The action of the catch is automatic, for as will be seen, the sheath in descending exerts a pressure upon it to force it slightly back from its inclined or engaging position, in which it normally remains and which it seeks immediately upon the removal of that pressure. For purposes of this engagement of the catch 12 with the plate-carrier the lower bar 13 of the carrier-frame is provided with lateral projections 14, which are rounded on its under side in the same manner as is the entire bar, whereby to facilitate the carrier's entrance into the magazine by guiding it past the upper end of the rear carrier of the pack, the springs 10, and the catch 12; but the upper face of the projections 14 is flat to form a shoulder or abutment against which the under side of the catch 12 will bear when the carrier has been forced down to the limit of its movement. When an engagement has been thus effected, the sheath can be withdrawn, leaving in so doing the engaged carrier within the magazine, after which the sheath is returned to the front slot, where it incloses the front carrier and closes the exposure-opening of the magazine. In this normal position of the component parts of the invention the magazine can be detached from the camera, or if it be desired to make an exposure of the plate now within the sheath the carrier can be engaged by the catch located at the lower left-hand corner of the case, (see Fig. 4,) which consists of a spring-arm 15, operative within a recess 16 and having at its free end a projection 17, by which the engagement is effected by the abutting of said projection upon the lateral projection 14 of the carrier, substantially as in the operation of the catch 12 therewith; but as the employment of this catch is desirable only as independent of the operation of plate transference it is not automatic, being operated by a press-button 18, concealed beneath the covering of the case and acted on by hand-pressure from without. The tension of the spring-arm 15 is to normally keep it and its catch 17 within the recess. To effect an exposure of the plate within the sheath, the button is pressed and held under pressure while the sheath is being withdrawn.

From the foregoing the working and general features of construction of the magazine will be understood. It therefore remains that reference be specifically made to certain details of the invention necessary to its efficient working.

The case, as will be seen by reference to Figs. 2 and 3, is provided with a horizontal partition 19, located near the top 20 and in which are formed slots 5' and 6' to correspond with the slots in the top. Between the top 20 and partition 19 are formed, at each side of a central division bar or block 21, recesses 22 22, in which are located the means for excluding the light from the magazine. This provision for closing the slots consists in a shutter 23, covered with felt or other suitable material and hinged to the top 20 at the rear of the opening and is of such length as to abut the opposite side of its respective recess in an inclined position, which position not only is such in which the shutter effectually closes the passage from the outer to the inner slot, but admits the end of the sheath 7 into the recess formed by the top and partition before engaging the shutter, thus closing the outer slot before the shutter is forced back to allow the sheath to pass farther down. This shutter is of automatic action, being actuated at all times by the arched spring 24, and as the sheath engages it in being forced in this spring exerts its increased pressure to keep the said shutter in close contact with the sheath and also force the sheath against the felt-covered or padded wall 25 of the recess, thus insuring the exclusion of light, notwithstanding a careless or hurried insertion of the sheath.

In Fig. 10, in which the sheath is shown in the act of being inserted, will be seen the position assumed by the shutter during such operation. In this position its full felted face will lie pressed against the sheath, while its rear angle portion 26, with which the shutter is provided at its upper edge, is brought into contact with the top 20 to preclude all possibility of light entering through the hinge and also to form a stop to limit the backward or opening movement of the shutter. At the ends of the slots 5 and 6 there is provided a cushion 27, which, together with the angular blocks 28 and 29, fitted above and below the shutter, prevent the light from entering at the sides, as these blocks present a shoulder to the shutter by extending out to overhang the shutter's ends.

As the sheath enters the case through slot 5 it is held in its vertical position by engaging and working within grooves or ways 30, formed by the vertical bars 31, attached, respectively, to the side of the case and in alinement with the rear of the slot. Within the grooves 30 are located spring-actuated dogs 32, one on each side, which are designed to engage the plate-carriers and hold them as they are advanced to the front of the pack, so that they may be directed into the sheath. The front face of the case is recessed, as at 33, to countersink the dogs, which provision limits the outward swing of their engaging ends. By means of the spring 34 the dogs are kept distended, which is their normal position, engaging therein the sides of the plate-carrier at the front of the pack, while an extension or arm 35, forming a part of the dog, projects between the case and the front of the carrier to hold the carrier sufficiently away from the face of the case whereby to allow for the thickness of the walls of the sheath, which must enter the case between the said front face and the plate-carrier. The action of the dogs 32 in directing the plate-carriers into the sheath is such as to provide for the proper placing of the carrier both with respect to its forward as well as its lateral movement.

The sheath in descending first engages the upper end of the plate-carrier, and when the said carrier has been well directed into the sheath the dogs are engaged and forced back upon the further descent of the sheath until they lie flat within the grooves 30. This action releases the plate-carrier, while at the same time it causes the dogs to act on the sheath to hold it firmly within the case.

To insure and facilitate the entrance of the carriers into the sheath, the top cross-frame 36 is tapered to a single edge, by which tapering the carriers will be guided backward and forward in their engagement with the descending sheath, as may be required, while the side frames where they connect with the top cross-frame are tapered or rounded, as at 37, having also a guiding function whereby to direct the plate-carrier into the sheath should said carrier be slightly to one side of the sheath's opening, and, further, to allow the carrier to act upon the springs 9 within the sheath to cause said springs to be gradually depressed.

The cross-frame 13 of the carrier is provided with a shoulder 38 on the side exposing the plate 39, which shoulder permits the face of the carrier to lie in close contact with the interior face of the sheath, while it engages a shoulder 40 of the sheath. A metal strip or plate 41, countersunk in the sheath and overhanging its lower edge, presents an engaging face to the vertical face of the shouldered portion of the carrier cross-frame and insures the exclusion of light from the plate. While the shoulder 38 tends to increase the width of the carrier at this point, such tendency is met and for all practical purposes overcome by rabbeting the rear face of the frame, as at 42, to receive the shouldered portion of its adjacent carrier. Thus the pack of carriers is not increased in bulk, as will be seen by reference to Fig. 2.

The entering end of the sheath is beveled and rounded slightly, as at 43, to approximate the form of recess within the slots and above the shutters, whereby it is adapted to act upon the shutters with greater facility, having a wedge action, and also to permit the curved end 12 of the catch 11 to lie in engagement with the projection 14 of the carrier and against the sheath.

On the left-hand side of the magazine will be seen the dial 44 of a registering device operated automatically by the sheath in depositing a carrier within the case through slot 6. By reference to Fig. 3, in which the interior mechanism of the register is shown, it will be seen that the shaft 45, to which the dial is secured, has its bearing in a metal plate 46, suitably attached on the inner side of the case and also forming a wearing-face against which the ratchet-wheel 47 may lie. The ratchet-wheel is rigidly mounted on the shaft 45, so that its turning will rotate the dial 44, which is also rigidly secured thereto. Upon the shaft 45 is loosely mounted the lever 48, by which the downward movement of the sheath is imparted to the ratchet-wheel. On the short arm of said lever is carried a pawl 49, held in contact with the teeth of the ratchet-wheel by the spring 50. To the short arm of the lever is also secured the coiled spring 51, which exerts a pull to keep the lever in the position shown, a stop being formed by the bar 31 or other obvious means to limit its rocking movement. The long arm of the lever extends into the path of the sheath below the rear slot 6 and is provided with a curved engaging face 52 to receive the contact of the sheath.

The action of the sheath in entering the slot 6 with a carrier is to engage and depress the lever 48, which operation turns the ratchet-wheel and dial, and on the withdrawal of the sheath the lever returns to its normal position, the ratchet-wheel remaining advanced, being held against backward movement by the spring-pressed pawl 53. It will therefore be seen that each carrier as exposed and deposited in the rear of the magazine will be automatically registered, and thus it will be indicated when all the plates have been exposed.

By virtue of the twofold character of the device herein set forth, in that it serves the double function of a magazine and a plate-holder, it will be found desirable often to use several of the magazines in conjunction with a camera, removing each from the camera after the plates therein have been exposed and employing them as holders, the advantages of which use being many and obvious.

Having thus fully described our invention, what we claim, and desire to secure by Letters Patent, is—

1. A detachable magazine for cameras, comprising a case having an exposure-opening for the plates therein, and slots or openings for the transference of the said plates from the front of the pack to the rear thereof, in combination with a plate-transferrer for alternate operation within said slots or openings, and adapted to close the exposure-opening when inserted in the forward slot, as and for the purpose set forth.

2. A photographic magazine plate-holder, comprising a case provided with slots or openings therein for the transference of the plates or plate-carriers from the front of the pack to the rear thereof, and a plate-transferrer for alternate use in said openings, adapted to descend upon the plates or plate-carriers, and inclose the same, as and for the purpose set forth.

3. A photographic magazine plate-holder, comprising a case provided with a slot or opening for the extraction of the plates or plate-carriers contained therein, and a slot or opening for the insertion of the extracted plate or plate-carrier, a sheath or case adapted to enter the extracting-slot to inclose the front plate or plate-carrier of the pack, and retain said plate or plate-carrier therein, whereby it may be withdrawn from the magazine, and the said sheath inserted in the inserting slot or opening with the retained inclosed plate or plate-carrier, and means for engaging the plate or plate-carrier to withdraw it from the sheath as said sheath is withdrawn, as and for the purpose set forth.

4. A photographic magazine plate-holder, comprising a case provided with slots for the transference of the plates or plate-carriers from the front to the rear of the pack therein, a transferring sheath or case adapted to enter said slots and descend upon the forward plate or plate-carrier to inclose the same, means located within said sheath to engage and retain the inclosed plate or plate-carrier, and means for engaging the plate or plate-carrier to withdraw it from the sheath after transference, as set forth.

5. A photographic magazine plate-holder, comprising a case provided with slots for the transference of the plates or plate-carriers from the front to the rear of the pack therein, a plate or plate-carrier transferrer, means for automatically releasing the transferred plate or plate-carrier from the transferrer, and means for automatically advancing the plates or plate-carriers, as set forth.

6. A photographic magazine plate-holder, comprising a case provided with slots or openings for the successive transference of the plates or plate-carriers from the front to the rear of the pack therein, a plate, or plate-carrier transferring sheath adapted to enter the slots and inclose one of the plates or plate-carriers, light-excluding shutters provided said slots and adapted to normally close them and to bear against the said sheath while it is within the magazine, means for holding the plate or plate-carrier within the sheath, and means for releasing the same upon the withdrawal of the sheath after a transference has been made, as set forth.

7. A photographic magazine plate-holder, comprising a case provided with slots or openings for the successive transference of the plates or plate-carriers from the front to the rear of the pack therein, a transferring-sheath operative within said slots or openings, automatic shutters provided said slots or openings, and means for retaining the transferred plate or plate-carrier within the case, as set forth.

8. A photographic magazine plate-holder, comprising a case adapted to contain a plurality of plates or plate-carriers, a plate-transferrer adapted to transfer the plates or plate-carriers from the front to the rear of the pack through slots or openings in said case, and means, controlled by the plate-extractor, for automatically engaging said plates or plate-carriers as they advance forward, whereby to hold them in position to be engaged by the extractor, as set forth.

9. In a photographic magazine plate-holder, the combination with a case provided with slots for the transference of the plates, of a plurality of plate-carriers arranged within said case, means for advancing the said carriers as one is withdrawn, a transference-sheath working within said slots, and means adapted to engage the carriers as they are advanced and hold them so as to enter the sheath, and to release said carriers automatically, as set forth.

10. A photographic magazine plate-holder comprising a case adapted to contain a plurality of plates or plate-carriers, a plate-transferrer adapted to transfer the plates or plate-carriers from the front to the rear of the pack through slots or openings in said case, and spring-actuated arms located in the path of the extractor and on each side of the case, adapted to be released by the extractor as said extractor is withdrawn, whereby said arms are caused to engage the forward plate or plate-carrier, and disengaged from the plate or plate-carrier by the insertion of the extractor, as and for the purpose set forth.

11. In a photographic magazine plate-holder, the combination with a case having slots or openings therein for the transference of the plates, plate-carriers having projections at one end, a transferring-sheath working in said slots, and a catch adapted to engage the said projections of the carriers, as and for the purpose set forth.

12. In a photographic magazine plate-holder, the combination with a case having an extractor-sheath working therein, of a plate-carrier, adapted to enter the said sheath, having its lower end frame or bar formed with a shoulder on its exposure side, as and for the purpose set forth.

13. In a photographic magazine plate-holder, the combination with a case having an extractor-sheath working therein, of plate-carriers, adapted to enter said sheath, having their lower end frames or bars formed with a shoulder on the exposure side, and rabbeted on its other side to receive the shoulder of the adjacent carrier, as and for the purpose set forth.

14. In a photographic magazine plate-holder, the case adapted to contain plates or carriers and have operative therein through an opening in said case, a sheath for the extraction of the plates or plate-carriers, said case being provided with an interior slotted partition, a shutter located within the passage from the outer opening or slot to the slot or opening in the partition, and a spring for actuating said shutter to close said passage, as and for the purpose set forth.

In witness whereof we have hereto set our hands this 27th day of July, 1897.

EDGAR R. BULLARD.
CLEMENT C. SMITH.

In presence of—
  GEO. E. HOUSE,
  R. J. BULLARD.